T. D. MARSH.
Lawn-Mowers.

No. 196,241.　　　　Patented Oct. 16, 1877.

WITNESSES
Henry N. Miller
C. L. Evert.

INVENTOR
T. D. Marsh
Alexander Mason
ATTORNEYS.

UNITED STATES PATENT OFFICE.

TIMOTHY D. MARSH, OF JERSEY, OHIO, ASSIGNOR OF ONE-HALF HIS RIGHT TO FRANK M. CRANE, OF SAME PLACE.

IMPROVEMENT IN LAWN-MOWERS.

Specification forming part of Letters Patent No. 196,241, dated October 16, 1877; application filed October 18, 1876.

*To all whom it may concern:*

Be it known that I, TIMOTHY D. MARSH, of Jersey, in the county of Licking and State of Ohio, have invented certain new and useful Improvements in Lawn-Mowers; and I do hereby declare the following to be a full, clear, and exact description thereof, reference being had to the accompanying drawing, and to the letters of reference marked thereon.

The nature of my invention consists in the construction and arrangement of a lawn-mower, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
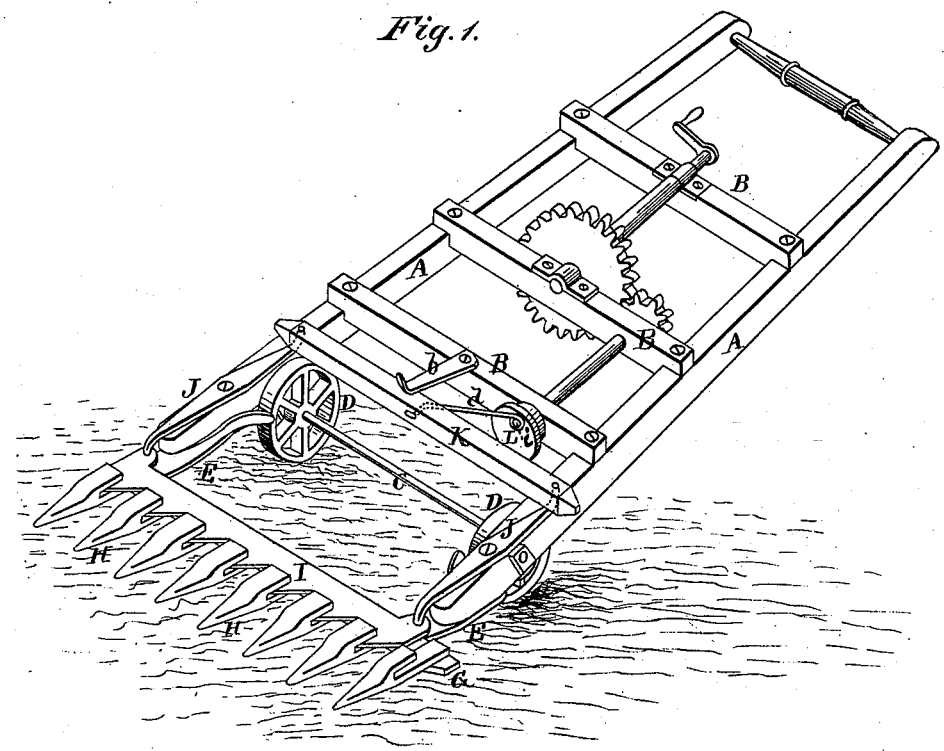
Figure 2:
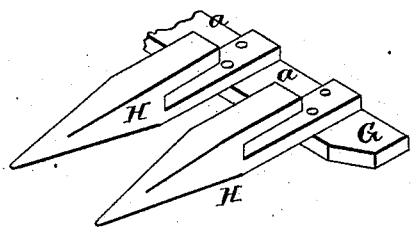

Figure 1 is a perspective view of my lawn-mower, and Fig. 2 is an enlarged perspective view of a portion of the finger-bar.

A A represent two side bars, connected by suitable cross-bars B B to the frame of the lawn-mower. Near the lower end of this frame are suitable boxes to receive the axle C carrying the wheels D D.

To the lower ends of the side bars A A are secured suitable fastenings E E, to which the finger-bar G is fastened.

H H are the fingers, which are attached on top of the finger-bar G, so as to form recesses *a a* between the fingers, as shown.

The cutter-bar I rests and moves upon the rear ends of the fingers, and the recesses *a a* prevent the grass from clogging, as with these recesses any grass that gets in between can pass out behind, which it cannot do where the finger and cutter bars form two continuous flat surfaces in contact with each other.

The cutter-bar I is operated by means of a pivoted lever, J, at each end, said levers being pivoted to the frame, and their upper ends connected by a cross-bar, K, as shown. This cross-bar is simply placed loosely on pins formed on or attached to the upper ends of the levers, and said bar is held down by means of a latch, *b*, so that by turning said latch to one side the bar can be easily lifted off, if required, and then, by turning the levers J J to one side, the cutter can be readily detached for sharpening or for other purposes.

*d* is the pitman connecting the cross-bar K with the crank or wrist pin *i* of a rotating disk, L.

By connecting the pitman with the cutter-bar by means of the two levers—one at each end—the cutter-bar is run easily, and requires but little power to operate it.

The wheel or disk L may be operated by gearing, as shown, or in any other suitable manner.

Having thus fully described my invention, what I claim as new, and desire to secure by Letters Patent, is—

A lawn-mower consisting of the truck and frame A, the cross-bar B, placed loosely on pins formed on or attached to the levers J J, which are pivoted to the frame, the cutter I, connected to the lower ends of the levers, the latch *b*, and the operating mechanism, organized and arranged substantially as shown and described.

TIMOTHY DWIGHT MARSH.

Witnesses:
FRANK GALT,
C. L. EVERT.